United States Patent [19]

Hiramatsu

[11] Patent Number: 4,617,092

[45] Date of Patent: Oct. 14, 1986

[54] PROCESS FOR CONTROLLING A DISTILLATION COLUMN

[75] Inventor: Teruaki Hiramatsu, Omiya, Japan

[73] Assignee: Nippon Zeon Co. Ltd., Tokyo, Japan

[21] Appl. No.: 655,192

[22] Filed: Aug. 9, 1984

[30] Foreign Application Priority Data

Aug. 9, 1983 [JP] Japan .................................. 58-144483

[51] Int. Cl.$^4$ .............................................. B01D 3/42
[52] U.S. Cl. ........................................... 203/1; 203/2; 202/160; 202/206; 364/501
[58] Field of Search ................ 202/206, 160; 203/1-3, 203/DIG. 18; 196/132; 364/501

[56] References Cited

U.S. PATENT DOCUMENTS

| | | | |
|---|---|---|---|
| 3,032,479 | 5/1962 | Norman | 202/206 |
| 3,108,929 | 10/1963 | Tolin | 202/206 |
| 3,224,947 | 12/1965 | Lupfer | 202/206 |
| 3,269,921 | 8/1966 | Oglesby et al. | 202/206 |
| 3,342,699 | 9/1967 | Rijnsdorp | 202/206 |

Primary Examiner—Wilbur Bascomb
Attorney, Agent, or Firm—Armstrong, Nikaido, Marmelstein & Kubovcik

[57] ABSTRACT

A process for controlling a distillation column in which feed liquid supplied thereto is heated by heating steam comprises the steps of: controlling the steam flow rate so that the steam flow rate is increased in response to the difference between the temperature measured at the bottom of a calculated column and the temperature of boiling point of the feed liquid until the former temperature exceeds the latter temperature when the former is not higher than the latter; controlling the steam flow rate so that the temperature around an intermediate tray falls within a first predetermined temperature range when the temperature measured at the bottom of the column exceeds the calculated temperature of the boiling point of the feed liquid; controlling the steam flow rate so that a reflux ratio is adjusted to within a predetermined reflux ratio range when the temperature around the intermediate tray falls in the predetermined temperature range; and controlling the steam flow rate so that the reflux ratio is maintained within the predetermined reflux ratio range and the temperature around the intermediate tray is maintained within the predetermined temperature range and the reflux ratio falls in the predetermined reflux ratio range.

1 Claim, 2 Drawing Figures

PROCESS FOR CONTROLLING A DISTILLATION COLUMN

BACKGROUND OF THE INVENTION

The present invention relates to a process for controlling a distillation column which has been widely used in petrochemical industry.

Control of the distillation column has to maintain the purity of a product within a predetermined range and to suppress the loss of material due to a product from the bottom of the column. Therefore, the amount of reflux of the product at the top of the column has heretofore been controlled in response to a temperature difference between the column top and a tray in order to keep the purity of the product. Furthermore, reboiler flow rate is controlled so that the temperature at the column bottom becomes a given temperature.

However, if there are changes in the supply amount of the feed liquid and temperature, the heat equilibrium of the distillation column is lost which exerts an influence upon the product purity. Therefore, it has been attempted to control the heat equilibrium by adjusting the flow rate of the heat source from a heater. It is difficult to maintain the product purity only by manually controlling the flow rate of the heat source, due to dead time and response delay of a system.

Therefore, the distillation column is operated to reduce influences due to changes in supply of feed liquid and temperature by presetting an amount of reflux and/or the flow rate of the heat source high.

However, if the distillation process is controlled by using steam there is a disadvantage that an excess heating energy is consumed, because control is accomplished in view of a security factor.

SUMMARY OF THE INVENTION

It is therefore an object of the present invention to provide a process for controlling a distillation column which can overcome the disadvantage mentioned above so as to reduce the amount of heating energy needed as low as possible.

In accordance with the present invention, there is provided a process for controlling a distillation column in which feed liquid supplied thereto is heated by heating steam comprising the steps of: controlling the steam flow rate so that the steam flow rate is increased in response to the difference between the temperature measured at the bottom of the column and a calculated temperature of boiling point of the feed liquid until the former temperature exceeds the latter temperature when the former is not higher than the latter; controlling the steam flow rate so that the temperature around an intermediate tray falls within a predetermined temperature range when the temperature measured at the bottom of the column exceeds the calculated temperature of the boiling point of the feed liquid; controlling the steam flow rate so that a reflux ratio is adjusted to within a predetermined reflux ratio range when the temperature around the intermediate tray falls in the predetermined temperature range; and controlling the steam flow rate so that the reflux ratio is maintained with the predetermined reflux ratio range and the temperature around the intermediate tray is maintained within the predetermined temperature range and the reflux ratio falls in the predetermined reflux ratio range.

The present invention permits reducing the steam flow rate while maintaining desired compositions at both top and bottom of the column and permits reducing the heating energy needed as low as possible.

BRIEF DESCRIPTION OF THE EMBODIMENT

The present invention will be described by way of an embodiment with reference to the drawings.

Figure 1:
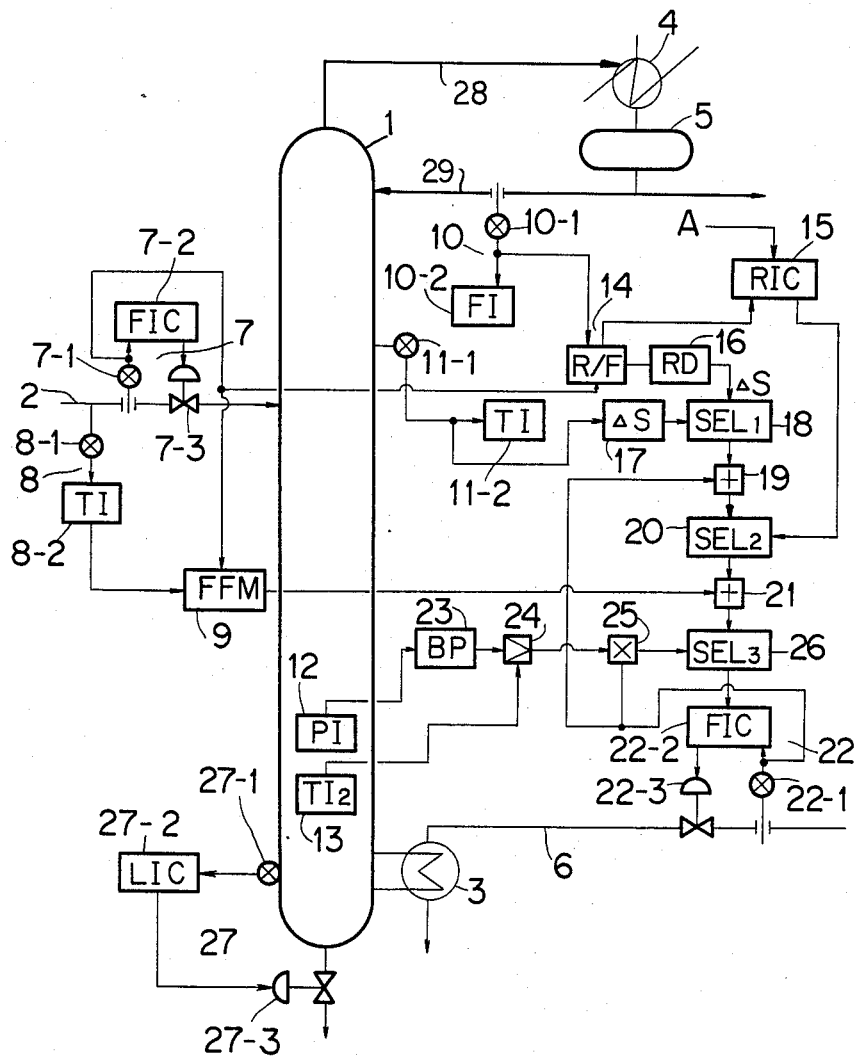
FIG. 1 is a schematic diagram showing an embodiment of a control system in which the present invention is incorporated.
Figure 2:
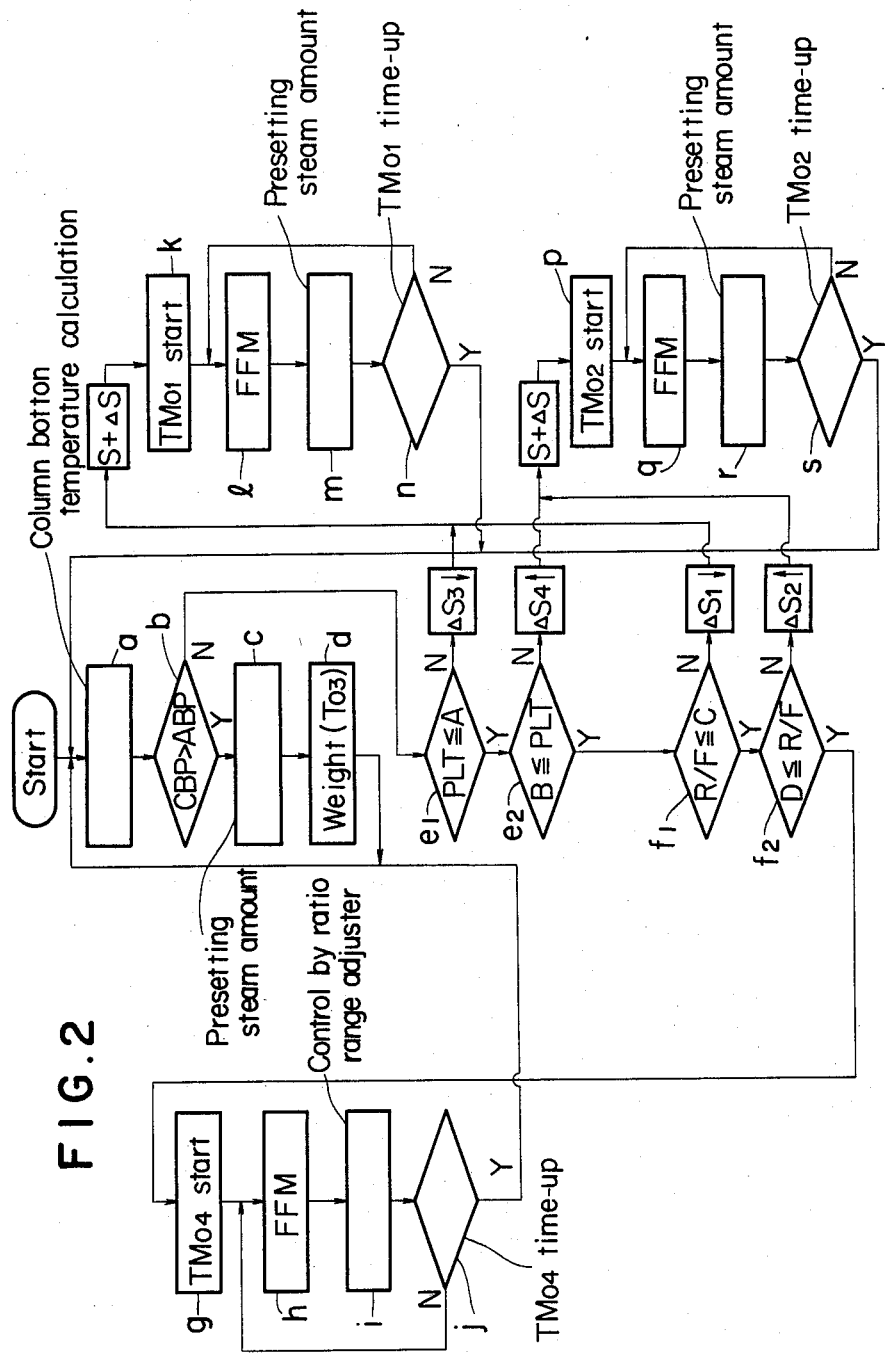
FIG. 2 is a flow chart for explaining the operation of the embodiment shown in FIG. 1.

Referring now to FIG. 1. and FIG. 2 in conjunction therewith, there is shown a distillation column 1 which is supplied with feed liquid through a line 2 from a receiver tank (not shown). The product from the top of the column 1 is fed by line 28 into a heat exchanger 4 and cooled therein, and then, it is refluxed to the distillation column 1 via a product reservoir 5 through line 29. The bottoms of the distillation column 1 is fed to a heat exchanger 3 where it is heat-exchanged with steam supplied via a line 6, whereby the bottoms are heated.

The flow rate of the feed liquid which is supplied to the distillation column 1 via a line 2 is controlled to a constant value by means of a flow rate indicating and adjusting device 7, and the temperature of the feed liquid is measured by a temperature indicator 8.

The flow rate indicating and adjusting device 7 comprises a flow rate detector 7-1, a flow rate indicating adjustor 7-2, and a flow rate adjusting valve 7-3. The temperature indicator 8 comprises a temperature detector 8-1 and a temperature indicator 8-2. The outputs of the flow rate detector 7-1 and the temperature detector 8-1 are connected with a feedforward model 9.

On the other hand, the amount of reflux from the product reservoir 5 to the distillation column 1 is measured by a flow rate indicating device 10 which comprises a flow rate detector 10-1 and a flow rate indicator 10-2.

The temperature around an intermediate tray portion of the distillation column 1 is measured by a temperature indicating device 11 which comprises a temperature detector 11-1 and a temperature indicator 11-2.

The pressure and temperature at the bottom of the distillation column 1 are measured by a pressure indicating device 12 and a temperature indicating device 13 respectively.

On the other hand, a signal representative of the flow rate of the feed liquid and a signal representative of the flow rate of reflux are supplied to a ratio operation device 14 where the ratio of the reflux flow rate to the flow rate of the feed liquid is calculated. The result of the operation is supplied to a ratio indicating and adjusting device 15 as a process variable, where it is compared to a preset value supplied to the ratio indicating and adjusting device 15. The device 15 provides an output corresponding to the deviation therebetween. The output of the ratio operational device 14 is connected with a ratio range detector 16. The ratio range detector 16 is adapted to output a signal ($\Delta S_1$) when the output of the ratio operational device 14 is greater than a predetermined range and to output a signal ($\Delta S_2$) when the output of the ratio operational device is less than a predetermined range.

The output of the temperature detector 11-1 of the temperature indicating device 11 is connected with an operational device 17. The operational device 17 is adapted to output a signal ($\Delta S_3$) when the output of the temperature detector 11-1 is higher than a predetermined range and to output an signal ($\Delta S_4$) when it is lower than a predetermined range. The outputs of the ratio range detector 16 and the operational device 17 are connected with a selection circuit 18. The selection circuit 18 detects the outputs from the operational device 17 and the ratio range detector 16. The selection circuit 18 selects the output from the operational device 17 according to priority and selects the output from the ratio range detector 16 when the operational device 17 does not provide any output.

An output (S) representative of the steam flow rate supplied to the heat exchanger 3 which will be hereafter described and the output of the selection circuit 18 are supplied to an adder 19 where they are added. The output from the adder 19 is connected with the selection circuit 20. The output of the ratio indicating and adjusting device 15 is also connected with the selection circuit 20. The selection circuit 20 selects the output from the adder 19 according to priority when the selection circuit 20 provides an output, and selects the output from the ratio indicating and adjusting device 15 when the selection circuit 18 does not provide any output.

On the other hand, the steam flow rate to be supplied to the heat exchanger 3 is controlled by means of a flow rate indicating and adjusting device 22 in response to a preset value which is an output from the selection circuit 26 hereafter described. The flow rate indicating and adjusting device 22 comprises a flow rate detector 22-1, a flow rate indicating adjustor 22-2 and a flow rate control valve 22-3. The signal representative of a pressure at the bottom of the column detected by the pressure indicating device 12 is supplied to a boiling point operational device 23 where it is converted into a boiling point corresponding to the pressure at the column bottom. The boiling point temperature operated by the boiling point operational device 23 is fed to the comparing operational device 24 where it is compared with the temperature at the column bottom detected by the temperature indicating device 13. The comparing operational device 24 provides an output $F(\Delta T)$ corresponding to the difference $\Delta T$ when the temperature at the column bottom (ABP) is equal to or less than the calculated boiling point temperature (CBP) operated by the boiling point operational device 23. The output $F(\Delta T)$ from the comparing operational device 24 is supplied to a multiplier 25 where it is multiplied with the steam flow rate detected by the flow rate detector 22-1.

The output of the selection device 20 is supplied to the adder 21 where it is added with the output from the feed-forward model 9. The outputs of the adder 21 and multiplier 25 are connected with the selection circuit 26. The selection circuit 26 selects the output from the multiplier 25 according to priority when the multiplier 25 provides an output and selects the output from the adder 21 when the multiplier 25 does not provide any output, so that the selection circuit 26 generates a preset signal to the flow rate indicating adjustor 22-2.

The selection circuit 26 continues to provide an output having a same level for a given period of time $T_{03}$ since it selects the output from the multiplier 25.

The selection circuit 20 also continues to provide an output of the ratio indicating adjustor 15 for a given period of time $T_{04}$ since it selects the output from the ratio indicating adjustor 15.

The selection circuit 18 continues to generate an output having a level same as that at the selection for a given period of time $T_{01}$ since it selects the output signal ($\Delta S_1$) from the ratio range detector 16 or the output signal ($\Delta S_3$) from the operational device 17. The selection circuit 18 also continues to hold an output level at the selection for a given period of time $T_{02}$ since it selects the output signal ($\Delta S_4$) from the operational device 17.

The selection operation of the selection circuits 18, 20 and 26 is controlled in a manner shown in flow chart (described herebelow) by means of a control system (not shown) in accordance with a predetermined program.

After the operation is started, a calculated boiling point temperature CBP which has been converted from a pressure at the column bottom is compared with an actual temperature at the column ABP (steps a, b). The comparing operation device 24 generates an output $F(\Delta T)$ when CBP>ABP. The output $F(\Delta T)$ is multiplied with the output (S) of the steam flow rate detector 22-1. A preset value for the steam flow rate indicating adjustor 22-2 is set in response to the multiplication result obtained by the multiplier 25 via the selection circuit 26, so that the steam flow rate is controlled (step c). When the hold interval of the comparing operational device 24 has passed (step d), a control according to the result of comparison of CBP>ABP is carried out again. Steps a to d are repeated again while CBP>ABP. Accordingly, in this period of time the preset value for steam flow rate is successively increased, so that the steam flow rate is increased. The hold interval is determined depending on the dynamic characteristics of the distillation column 1. The selection circuit 26 selects the output of the adder 21, when ABP increases due to increase in the steam flow rate so that the relation CBP>ABP is not established at step b. Within this time, the selection circuit 20 selects the output of the ratio indicating adjustor 15 when a temperature around the intermediate tray PLT, that is, the output of the temperature detector 11-1 is within a predetermined range (an upper and lower limits of the range being referred to as A and B respectively) and a reflux ratio, that is, a ratio of an output of the feed liquid flow rate detector 7-1 to an output of the reflux flow rate detector 10-1 is within a range (an upper and lower limits of the range being referred to as C and D respectively) preset by the ratio operation device 14 (steps $e_1$, $e_2$, $f_1$, $f_2$). Accordingly, the output of the ratio indicating adjustor 15 is selected. The output obtained by adding the output of the ratio indicating adjustor 15 to the output of the feedforward model 9 is supplied as a presetting signal to the flow rate indicating adjustor 22-2 via the selection circuit 26 for the period of time $T_{04}$. The steam flow rate is controlled in accordance with the preset value corresponding to the sum of the output of the ratio indicating adjustor 15 and the output of the feed forward model 9 (steps g to j). The steps a to d are executed again after the passage of the period of time $T_{04}$. The steps $e_1$ to $f_1$ are executed when the relation CBP>ABP is not established at step b.

The operation device 17 generates an output $\Delta S_3$ when the temperature around the intermediate tray PLT shows a relation PLT>A at steps $e_1$ and $e_2$. The output $\Delta S_3$ of the operational device 17 is added with the output of the flow rate detector 22-1 by means of the adder 19. The sum output from the adder 19 is added with the output of the feedforward model 9 by means of the adder 21. The steam flow rate is controlled by the flow rate indicating adjusting device 22 for a period of time $T_{01}$ in accordance with a preset value corresponding to the output of the adder 21 (steps k to n). Steps a to d are executed again after the passage of the period of time $T_{01}$.

The operational device 17 generates an output $\Delta S_4$ when the temperature PLT around the intermediate tray at steps $e_1$ and $e_2$ is less than B. At step $e_{12}$ as is similar to the case at step $e_1$ when PLT>A, the sum of the output $\Delta S_4$ of the operational device 17 and the output of the flow rate detector 22-1 is added with the output of the feedforward model 9 by means of the adder 21, the sum output of which is applied to the flow rate indicating adjustor 22-2 as a preset signal. The steam flow rate is controlled in accordance with the preset value corresponding to the output of the adder 21 by means of the flow rate indicating adjustor 22 for a period of time $T_{02}$ (steps p to s). Steps a to d are repeated again after the passage of the period of time $T_{02}$.

Steps $f_1$ and $f_2$ are executed when the temperature PLT around the intermediate tray is $A \geq PLT \geq B$ at steps $e_1$ and $e_2$. The ratio range detector 16 generates an output $\Delta S_1$ S when the recirculation ratio is higher than a preset value C detected by the ratio operational device 14 at steps $f_1$ and $f_2$. The selection circuit 18 selects the output $\Delta S_1$ of the ratio range detector 16. Accordingly, the output $\Delta S_1$ of the ratio range detector 16 is added with the output of the flow rate detector 22-1 by the adder 19. The sum output of the adder 19 is added with the output of the feedforward model 9 by the adder 21, the sum output of which is applied to the flow rate indicating adjustor 22-2 as a preset signal.

The steam flow rate is controlled in accordance with the preset value corresponding to the output of the adder 21 by means of the flow rate indicating adjusting device 22 for a period of time $T_{01}$. Steps a to d are executed again after the passage of the period of time $T_{01}$.

The ratio range detector 16 generates an output $\Delta S_2$ and the selection circuit 18 selects the output $\Delta S_2$ of the ratio range detector 16 when the recirculation ratio detected by the ratio operation device 4 is less than a preset value D. The sum output $\Delta S_2$ of the ratio range detector 16 is added with the output of the flow rate detector 22-1 by means of the adder 19. The sum output of the adder 19 is added with the output of the feedforward model 9 by means of the adder 21. The output of the adder is supplied to the flow rate indicating and adjusting device 22 as a preset signal. The steam flow rate is controlled in accordance with a preset value corresponding to the output of the adder by means of the flow rate indicating adjusting a device 22 for a period of time $T_{02}$ (steps p to s). Steps a to d are executed again after the passage of the period of time $T_{02}$.

What is claimed is:

1. A process for controlling a distillation column, which includes heating a feed liquid supplied thereto by steam, comprising the steps of:
    (a) comparing a bottom temperature of the column with a calculated boiling point temperature of the bottom liquid and increasing the steam flow rate when the bottom temperature is lower than the calculated boiling point temperature, until the bottom temperature is greater than the calculated boiling point temperature; then
    (b) while maintaining the bottom temperature greater than the calculated boiling point, adjusting the temperature at an intermediate tray of the column to within a predetermined temperature range by adjusting the steam flow rate; then
    (c) while maintaining the predetermined temperature range, adjusting a ratio of the reflux flow rate to feed flow rate to within a predetermined ratio range by adjusting the steam flow rate; and then
    (d) maintaining the predetermined temperature range and predetermined ratio range by adjusting the steam flow rate.

* * * * *